(12) United States Patent
Teen (10) Patent No.: US 11,360,979 B2
(45) Date of Patent: Jun. 14, 2022

(54) RELEVANCE TUNING FOR ONLINE SEARCH

(71) Applicants: Atlassian Pty Ltd, Sydney (AU); Atlassian, Inc., San Francisco, CA (US)

(72) Inventor: Patrick Robert William Teen, Sydney (AU)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 219 days.

(21) Appl. No.: 16/718,159

(22) Filed: Dec. 17, 2019

(65) Prior Publication Data

US 2021/0182294 A1 Jun. 17, 2021

(51) Int. Cl.
*G06F 16/00* (2019.01)
*G06F 16/2453* (2019.01)
*G06F 16/953* (2019.01)

(52) U.S. Cl.
CPC ...... *G06F 16/24542* (2019.01); *G06F 16/953* (2019.01)

(58) Field of Classification Search
CPC .......................... G06F 16/24542; G06F 16/953
See application file for complete search history.

(56) References Cited

U.S. PATENT DOCUMENTS

2015/0161255 A1* 6/2015 Battle ................. G06F 16/9535
707/706

OTHER PUBLICATIONS

Burtini et al., "A Survey of Online Experiment Design with the Stochastic Multi-Armed Bandit", dated Nov. 4, 2015, 49 pages.

* cited by examiner

*Primary Examiner* — Hung Q Pham
(74) *Attorney, Agent, or Firm* — Brownstein Hyatt Farber Schreck, LLP (57) ABSTRACT

In an embodiment, the disclosed technologies are capable of creating and storing a digital repository capable of storing digital work items; receiving a query; determining historical alpha values and historical beta values for each of at least two candidate search algorithms; for each of the at least two candidate search algorithms, generating a beta distribution using the historical alpha values and the historical beta values as parameters; for each of the at least two candidate search algorithms, computing, using values sampled from the beta distribution, a score that indicates a likelihood of the candidate search algorithm producing a search result that satisfies a relevance criterion; selecting, from the at least two candidate search algorithms, an algorithm that has a score that satisfies a selection criterion; and executing the query using the selected algorithm.

13 Claims, 5 Drawing Sheets

RELEVANCE TUNING FOR ONLINE SEARCH

TECHNICAL FIELD

The present disclosure relates to computer software having online search capabilities. Aspects of the present disclosure are directed to tuning a search algorithm for document searching.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Computer software for document searching executes a search algorithm that evaluates stored electronic documents for relevance to a search query. In doing so, documents each may be assigned a score that reflects whether the document matches the search query.

SUMMARY

The appended claims may serve as a summary of the present invention.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

1. Textual Relevance

When a search system executes a search query on a document set, the search algorithm used by the search system may assign a textual relevance score to one or more documents in the document set. The textual relevance score indicates how well a particular document matches the query. For example, if a search term is "hot dog contest," a textual relevance score may indicate the number of times a particular document contains any of the words in the phrase "hot dog contest."

A high textual relevance score is not always an accurate indication that a document is highly relevant to a particular search query of a particular user. A search system using only textual relevance scores may return all documents that mention "hot dog contest" regardless of whether the user intended to search for hot dog eating contests or dog shows for dachshunds, for example.

A search system may perform sophisticated analyses on the contents of a document to improve the search system's ability to determine whether the document is relevant to a user's particular query. For example, a search system may analyze words or phrases surrounding query terms contained in a document to determine the document's subject matter and thus its relevance to a query.

2. Limitations of Textual Relevance Approaches

These approaches are not feasible, however, if the search system does not have access to the document text needed to perform those analyses because they would be very tedious and time consuming to reliably perform accurately.

Another technical challenge is that a search system cannot determine whether it returned a good set of search results in an automated way, without some kind of feedback mechanism. This challenge is exacerbated in situations in which access to interaction data; that is, information about users' interactions with search results, is restricted due to privacy or security constraints. Thus, in many cases, the need for user feedback necessitates the use of online testing.

In some software applications, the contents of documents are kept private, so that only the document creators or designated groups of users can view or read the text. More generally, portions of a search system that perform analytics may be prohibited from reading document contents, query terms, or search histories due to privacy constraints, security rules, legal limitations, or other reasons. Thus, one technical problem upon which this disclosure focuses is how to improve the accuracy and efficiency of transmitting search result data in a digital electronic search query system that interoperates with electronic documents having all or portions of contents that are private, unreadable or not subject to computer-aided or automated syntactic or semantic analysis.

3. Technical Solutions That Address Textual Relevance Limitations

Embodiments of the disclosed technologies improve upon the use of textual relevance scores in search systems by incorporating a set of relevance factors and corresponding weight values into the relevance determination for each document that is a candidate for a final set of search results to be shown to a user in response to the user's query. The set of relevance factors may include information that is unrestricted in the sense that access to the information by an analytics portion of a search system is not foreclosed by security rules, privacy policies, or other reasons. Examples of such information may include certain types of document metadata and/or document activity data.

Examples of document metadata that may act as relevance factors include a document's creation date, the document's author, and the location of the document within an online system. Examples of document locations within an online system include folders and spaces in which a document may be found within an online system. A "space" may refer to a logical storage location within a document hierarchy as implemented in an electronic document management system or in a federated application system. One example is the CONFLUENCE application, commercially available from Atlassian Pty Ltd, Sydney, Australia.

Examples of document activity data that may act as relevance factors include counts of the number of times a user issuing a search query has viewed or engaged with the document previously or recently. Examples of ways that a user may engage with a document include by creating the document, editing the document, commenting on the document, or sharing the document with another user through an online system.

Examples of documents include web pages, computer program files, electronic files created by word processor programs, and any type of digital file that may be created or stored by any type of document creation, editing, management, or collaboration software, including files that contain digital images, digital video, or digital audio alternatively or in addition to text.

A weight value reflects the relative importance of the particular relevance factor to which the weight value is assigned. Any weight value can be adjusted to improve the likelihood that documents included in a final result set are relevant to a particular search query of a particular user. For instance, a weight value may be increased if the system determines that a corresponding relevance factor has become a more significant determinant of relevance for a particular user or population of users, or a weight value may be decreased if the system determines that the corresponding relevance factor has become a less significant determinant of relevance.

A set of relevance factors and corresponding weight values may be referred to as a search algorithm, for ease of discussion. Different search algorithms have different combinations of relevance factors and weight values. For example, different search algorithms may have the same set of relevance factors but different weight values assigned to one or more of the relevance factors, or different search algorithms may have one or more different relevance factors, or different search algorithms may have some relevance factors in common and some different relevance factors and one or more different weight values.

In response to a query, a search system selects a search algorithm and uses the relevance factors and weight values defined by the search algorithm to evaluate documents in a result set that has been produced by the search system based on the documents' textual relevance score. For example, if the search algorithm has defined "recently viewed" as a relevance factor, and "2" is the weight assigned to the "recently viewed" relevance factor, and the result set produced based on textual relevance includes a document that the user issuing the query viewed within the past x hours, then the textual relevance score for that document may be increased twofold.

Relevance factors may be co-dependent, in which case the combination of relevance factors is treated as a new relevance factor that is assigned its own weight value. For example, suppose a relevance factor A is whether the user issuing the search query is the author of a document, and a relevance factor B is whether the document's creation date is within the last x hours. A relevance factor C may be defined as the co-occurrence of both A and B. Where a weight value is a multiplier, such as a value by which a textual relevance score may be multiplied, if relevance factor A's weight value is 3 and relevance factor B's weight value is 2, then relevance factor C's weight value could be 4. The co-occurrence of A and B might be a stronger indicator of relevance and thus warrant a higher weight value than either of those factors alone. Of course, the opposite could be true in some cases, as well.

Thus, a document's textual relevance score may be multiplied by the weight value assigned to a relevance factor, if the relevance factor is present or satisfied for a particular document, to produce a final relevance score for the document. A set of documents retrieved based on textual relevance to a query may be sorted, in descending order for example, based on the documents' respective final relevance scores. A subset of the sorted document set may be used to produce a final set of search results, which may be shown to the user who issued the search query.

4. Technical Challenges of Assigning Weight Values to Relevance Factors

As a technological matter, it is difficult for a search system to determine how to assign weight values to the various relevance factors, particularly in "online time." For instance, the search system may need to determine, in an online setting in which search results must be shown to a user within a reasonably prompt period time after the user enters a search query, whether a document that was recently viewed by the user is two times, three times, or 0.5 times more relevant than a document that was created by the user.

5. Limitations of Traditional A/B Testing Approaches

A traditional method of determining the weight values to be assigned to relevance factors is by doing A/B testing: running different search algorithms online, changing the weight values, and comparing the different algorithms' effectiveness using a success metric, such as click-through rate.

A drawback of the traditional A/B testing method is that it is very time consuming, because at each test iteration, the search algorithm to be tested is randomly selected. Identification of an algorithm that optimizes the chosen success metric therefore cannot occur until the testing is complete, which may take a week or longer in some cases. As the number of relevance factors increases, the number of tests increases, which in turn increases the amount of time needed to complete the testing. In some cases, search algorithm testing and tuning using the traditional A/B testing method may take several weeks. This length of time is simply too long to be workable, especially for an online environment.

An alternative to pairwise A/B testing is to run a single test in which all candidate algorithms are tested concurrently with a test user group, such that each time a user in the test group enters a search query, one of the candidate algorithms is randomly selected to run the query. This approach is infeasible because it is difficult to obtain enough results samples from the user group for the results to have statistical significance. Even then, the results may not be able to be clearly or conclusively interpreted as indicating that any algorithm is better than all of the others in the test, or that any algorithm is better than any other specific algorithm in the test.

6. Technical Solutions That Address Limitations of Traditional A/B Testing Approaches As described in more detail below, the disclosed technologies improve on traditional A/B testing approaches by incorporating a multi-armed bandit scheme into the search algorithm tuning process that assigns weight values to relevance factors. In an embodiment, the disclosed technologies perform operations including creating and storing a digital repository capable of storing digital work items; receiving a query; determining historical alpha values and historical beta values for each of at least two candidate search algorithms; for each of the at least two candidate search algorithms, generating a beta distribution using the historical alpha values and the historical beta values as parameters; for each of the at least two candidate search algorithms, computing, using values sampled from the beta distribution, a score that indicates a likelihood of the candidate search algorithm producing a search result that satisfies a relevance criterion; selecting, from the at least two candidate search algorithms, an algorithm that has a score that satisfies a selection criterion; and executing the query using the selected algorithm.

7. Benefits

In experiments, the disclosed technologies have been shown to reduce the time needed to select a search algorithm in accordance with a desired success metric to a point that the algorithm selection/tuning process can be incorporated into in an online search system. In addition, the disclosed approach has been shown, in experiments, to select the search algorithm that achieves the best results according to the desired success metric.

System Overview

Figure 1:
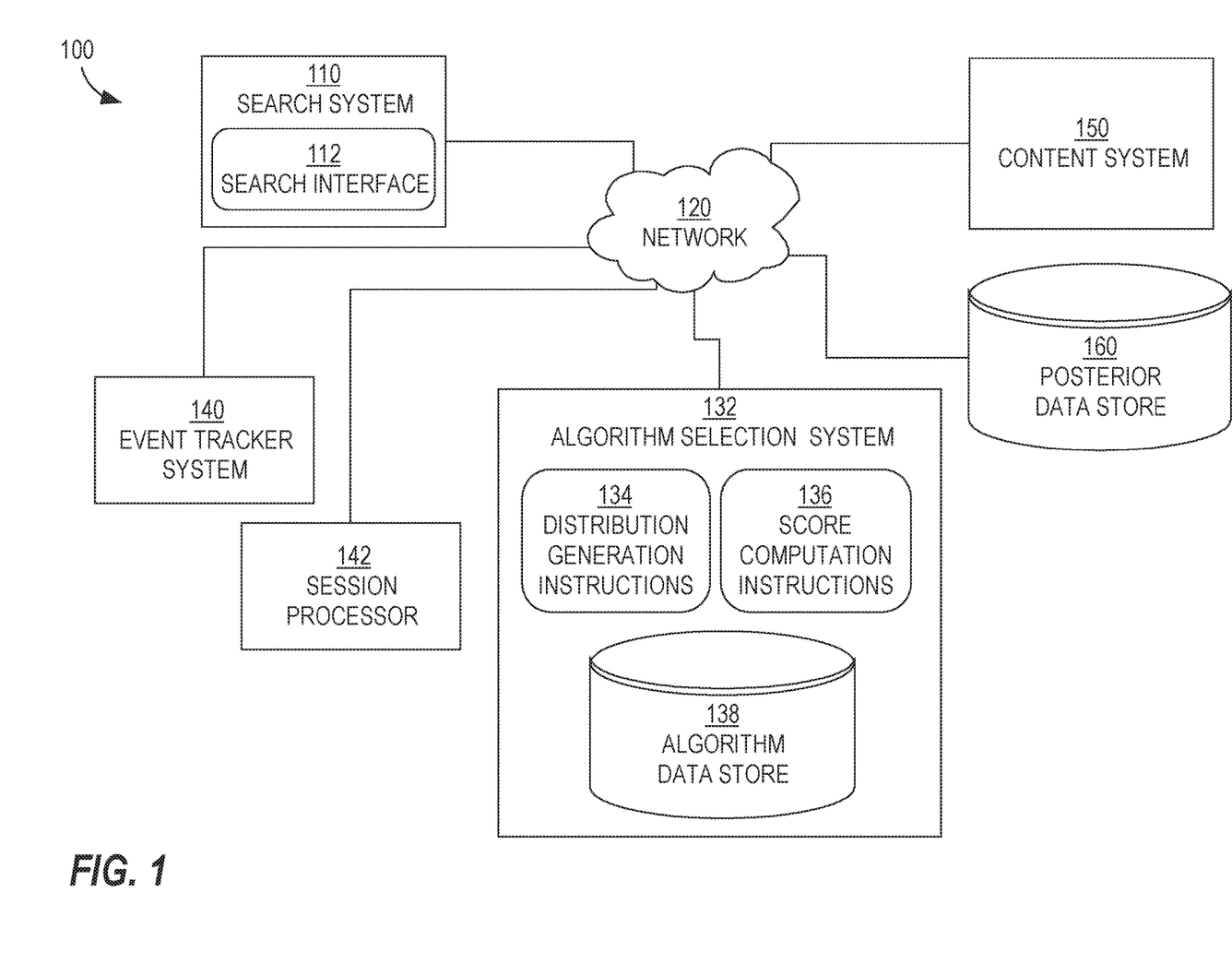
FIG. 1 is a block diagram illustrating at least one embodiment of a computing system in which aspects of the present disclosure may be implemented.

FIG. 1 illustrates a computing system in which embodiments of the features described in this document can be implemented.

In the embodiment of FIG. 1, computing system 100 includes a search system 110, an algorithm selection system 132, an event tracker system 140, a session processor 142, a content system 150, and a posterior data store 160. Search system 110 includes a search interface 112. Algorithm selection system 132 includes distribution generation instructions 134, score computation instructions 136, and algorithm data store 138.

Search system 110 receives and executes search queries on, for example, content system 150, and generates document sets in response to those search queries. Search system 110 computes textual relevance scores for documents that are candidates for inclusion in one or more document sets. Search system 110 communicates with algorithm selection system 132 to initiate and execute a process by which a search algorithm is selected for use in response to a query received by search system 110.

Search system 110 receives information from algorithm selection system 132 that identifies a selected search algorithm, retrieves the selected search algorithm's relevance factors and weight values from algorithm data store 138, and executes the selected search algorithm on content system 150 to produce a final document set that may be displayed on a display screen via search interface 112. As part of executing the selected search algorithm, search system 110 computes final relevance scores for documents that are candidates for inclusion in the final document set. To do this, search system 110 uses the relevance factors and associated weight values that are defined by the search algorithm that has been selected and identified to search system 110 by algorithm selection system 132.

As part of producing the final document set, search system 110 sorts the documents that are candidates for inclusion in the final document set according to the final relevance scores. In an embodiment, the candidate documents are sorted by final relevance score in descending order and the documents having final relevance scores in the top x % of all final relevance scores are included in the final document set.

Search interface 112 enables users and/or automatic processes to input search queries, initiate searches of content system 150, and view results of those searches. Thus, search interface 112 may provide a graphical user interface or a voice interface, for example, which allows users of computing system 100 to input queries and search content system 150. Alternatively or in addition, search interface 112 may provide an application program interface (API) to allow executing programs or processes to issue queries that search system 110 executes on content system 150, for example as part of a background or offline process.

Event tracker system 140 monitors a data stream of digital events that occur within search system 110 and/or content system 150 while in online operation. For example, event tracker system 140 may listen for events that indicate that a search query has been initiated, modified or abandoned. Such events may include digital user actions pertaining to displays of final document sets, such as clicks on particular buttons or icons, such as a like buttons or an edit button, or the lack of any such events over an interval of time. Event tracker system 140 logs data relating to events that it detects. In an embodiment, event data is collected and processed using a streaming job such as an APACHE SPARK job. In another embodiment, batch jobs may be used.

Other examples of user actions include digital signals of views, comments, and shares of documents that have been retrieved from content system 150 by search system 110 in response to a search query. While not specifically shown, event tracker system 140 includes a searchable data store which event tracker system 140 uses to store event data relating to logged events. An item of event data includes at least an event identifier, a timestamp, and an indicator or description of the type of event; for example, view, comment, edit, new search, etc. Event logging performed by event tracker system 140 may be subject to user consent as required by any applicable laws, rules, regulations or policies and modified accordingly.

Figure 4:
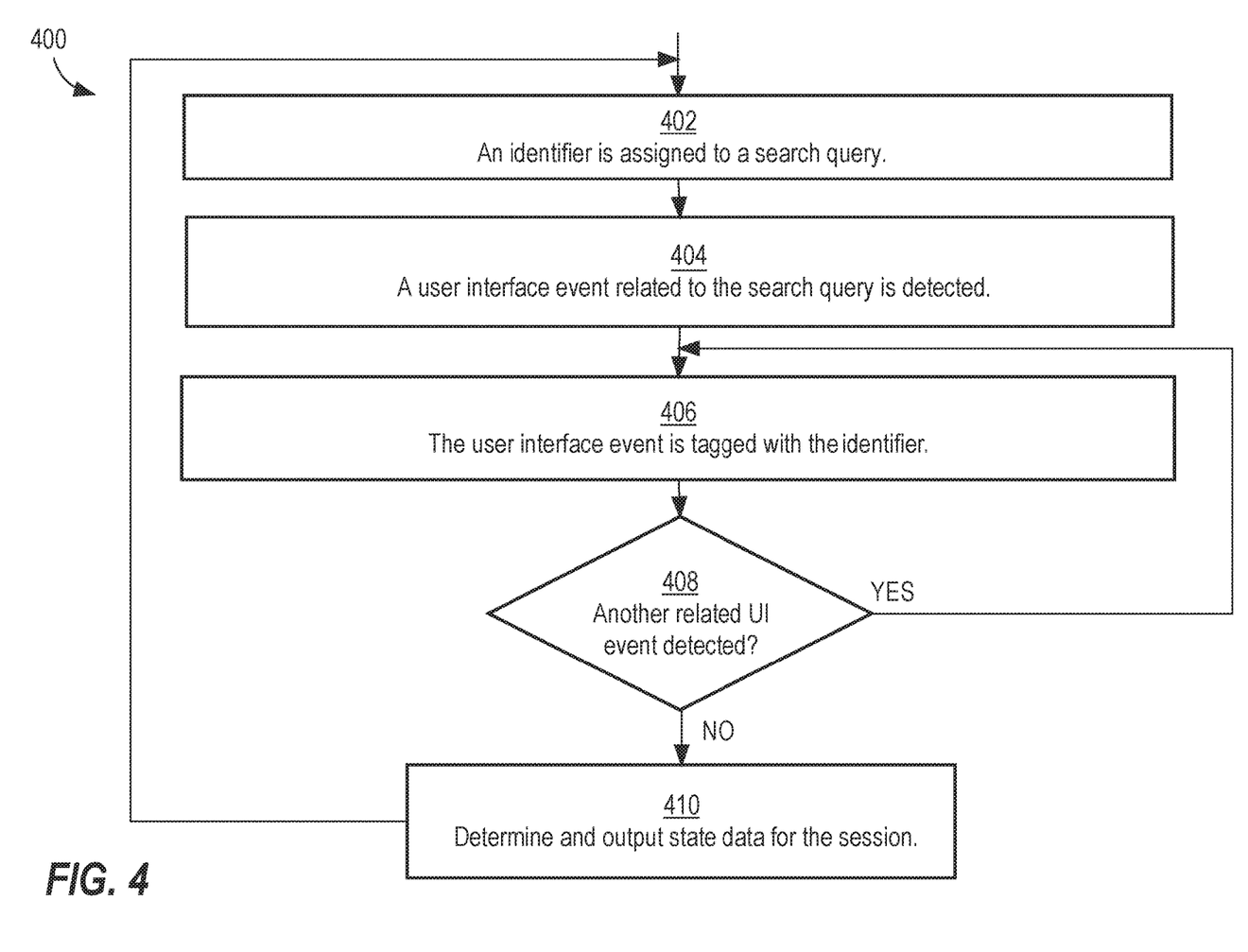
FIG. 4 is a flow diagram of a process that may be executed by one or more components of the computing system of FIG. 1.

Session processor 142 queries the data store of event tracker system 140 from time to time to look for event data pertaining to online search queries, including related user action data. Session processor 142 groups query events and related sequences of user action data into task sessions. One approach for creating task sessions is shown in FIG. 4, described below.

In an embodiment, when session processor 142 recognizes an event or sequence of events that is considered to be a signal of search algorithm success (for example, a click on a search result), session process 142 may immediately cause score computation instructions 136 to update the success score for the search algorithm that triggered the event to reflect the success. Likewise, if session processor 142 recognizes an event or sequence of events that is considered to be a signal that the algorithm was not successful (for example, no user action on any search results returned by the algorithm), session process 142 may immediately cause score computation instructions 136 to update the success score for the search algorithm that triggered the event to reflect the lack of success. Updates of algorithm success scores may be triggered using, for example, SPARK jobs or batch jobs.

While not specifically shown, session processor 142 includes a searchable data store which session processor 142 uses to store groupings of related digital events that form a task session. In an embodiment, an item of task session data includes at least a query identifier and one or more items of event data that are linked with the query identifier. Task session data is used, in an embodiment, by algorithm selection system 132 to determine the success rates of search algorithms that have been selected by algorithm selection system 132 and executed by search system 110.

Algorithm selection system 132 is an automated agent that selects search algorithms to be executed by search system 110 in response to search queries. In an embodiment, algorithm selection system 132 employs a multi-armed bandit model for algorithm selection, rather than randomly selecting a search algorithm as in the traditional AB testing approach.

In more detail, algorithm selection system 132 uses the multi-armed bandit approach to choose a search algorithm to serve to search system 110 in response to a particular query. The decision as to which algorithm to choose is informed by the historical success scores of all of the search algorithms in a set of candidate search algorithms. Using the multi-armed bandit model, algorithm selection system 132 uses the historical success scores to compute, for each of the candidate search algorithms, a confidence value that reflects the likelihood that the particular algorithm will be selected and served to search system 110 again in response to another query. In an embodiment, as described in more detail below, algorithm success scores, i.e., success estimates in the form of a distribution, are computed using two parameters, an alpha value and a beta value.

In general, a multi-armed bandit approach models the trade-off between exploring new possibilities and using current knowledge. Multi-armed bandits have been used to allocate patients to clinical trials and to decide prices for products. Neither of these applications is similar to the disclosed application. A multi-armed bandit has not been previously used by a search system to select a search algorithm for execution in response to an online query based on an optimization objective (for example, click-through rate or other success metric) according to the disclosed technologies. The disclosed application of multi-armed bandit techniques is considered both a practical and unconventional improvement to online search algorithm optimization technologies.

Distribution generation instructions 134 of algorithm selection system 132 generate a probability distribution for each search algorithm in a set of candidate search algorithms, where the set of candidate search algorithms contains at least two search algorithms that alternatively may be employed by search system 110 to execute a search of content system 150 in response to any given query. Distribution generation instructions 134 generate the probability distribution for a given search algorithm based on prior success scores, which have been computed based on prior executions of that algorithm by search system 110 that have produced alpha values and beta values. The prior success scores are computed using a designated success metric. Examples of success metrics that may be used to evaluate the relative effectiveness of different search algorithms are click-through rate (CTR) and search success rate. Search success rate may be computed using a technique that is described in more detail below with reference to FIG. 4. In general, use of search success rate as the success metric may result in more improved outcomes in some circumstances, while CTR may be preferred in circumstances in which a simple-to-understand metric is an important consideration. The success score priors are stored in posterior data store 160.

In an embodiment, initially, all algorithms in the set of candidate search algorithms have an equal chance of being selected for execution in response to any search query; that is, the probability distribution is the same for all algorithms. Over time, as searchers are executed, the probability distribution for each algorithm in the set of candidate search algorithms represents expected values of the success metric for that algorithm, and those probability distributions are newly generated for all candidate search algorithms in response to each new incoming search query. The algorithm probability distributions are updated as algorithms are selected and executed. In this way, new success scores are included in the distribution computations over time. Since a search algorithm is defined by a set of relevance factors and associated weight values, the probability distribution produced by distribution generation instructions 134 reflects a mathematical relationship between a particular set of relevance factor weight values and success scores.

Score computation instructions 136 uses the designated success metric, for example click through rate or success rate, to perform the success score computations for the search algorithms that have been selected by algorithm selection system 132 and executed by search system 110. In an embodiment, score computation instructions 136 computes a click through rate based on event data logged by event tracker 140 beginning at the time a search algorithm is executed and ending at a time after search results are shown to a user. A success score of 1 may be assigned to the algorithm execution if the user selects, for example by clicking or tapping, a document in the result set. A success score of 0 may be assigned to the algorithm execution if the user takes no action on any document in the result set produced by execution of the algorithm during a time period observed by event tracker system 140. In another embodiment, the success score is a success rate that is computed using task session data created by session processor 142, for example using the approach shown in FIG. 4, described below. As mentioned above, regardless of the method of computation, the success scores computed by score computation instructions 136 are stored in posterior data store 160.

Algorithm data store 138 is a searchable data store that stores search algorithm data including relevance factors and corresponding weight values for each candidate search algorithm. When a search algorithm is selected by algorithm selection system 132 in response to a search query using the disclosed multi-armed bandit approach, search system 110 obtains relevance factor data and corresponding weight values from algorithm data store 138. Search system 110 uses the data retrieved from algorithm data store 138 to compute the final relevance scores for documents in a result set that search system 110 has created based on the documents' textual relevance to the search query.

Posterior data store 160 is a searchable data store that stores alpha and beta values, and success scores that are computed by score computation instructions 136 from time to time in response to search algorithm executions by search system 110. In an embodiment, the alpha value is a count of successful query executions and the beta value is a count of unsuccessful query executions, where the determination of whether a query execution is successful or unsuccessful is made by analyzing user interaction data.

Posterior data store 160 is accessed by distribution generation instructions 134 when a new query is received by search system 110 and a search algorithm needs to be selected to execute the query. Distribution generation instructions 134 uses the data obtained from posterior data store 160 to generate the probability distributions for the candidate search algorithms. In an embodiment, posterior data store 160 is co-located with algorithm selection system 132 or at least distribution generation instructions 134 to reduce latency so that search system 110's response time for delivering search results to the user is within an acceptable range. Examples of co-locating include storing data and instructions on the same machine, on different machines in the same server cluster, or on different machines in different clusters in the same data center.

Content system 150 is a searchable repository of documents or an index to documents stored in a repository. In an embodiment, content system 150 is an enterprise system, such as a document management system, a code management system, a software development system, an issue tracking system, or any time of system in which documents are created or edited, whether by individuals or collaboratively by groups. Examples of embodiments of content system 150 include CONFLUENCE and JIRA, both by Atlassian. For instance, content system 150 may be used to create and store a repository of digital work items, where a digital work item is a document, such as a report, slide deck, technical description, source code file or any item of digital content created by an author or collaboratively by a group of authors. In an embodiment, search system 110 or at least search interface 112 is included as part of content system 150. As such, search system 10 may be used by authors of documents stored in content system 150 to search for and retrieve their own documents or documents authored by other users of content system 150. Access to content system 150 may be restricted, such that authors and other users of content system 150 may be required to register with content system 150 and access content system 150 via a user account and login process, in some embodiments. In an embodiment, search system 110 and content system 150 are instrumented to produce event data used by event tracker system 140 and session processor 142.

Each of search system 110, algorithm selection system 132, event tracker system 140, session processor 142, content system 150, and posterior data store 160 is implemented using one or more computing devices that are communicatively coupled to an electronic communications network 120. The features of search system 110, algorithm selection system 132, event tracker system 140, session processor 142, content system 150, and posterior data store 160 are implemented using computer software, hardware, or software and hardware, and may include combinations of automated functionality, data structures, and digital data, which are represented schematically in FIG. 1.

Search system 110, algorithm selection system 132, event tracker system 140, session processor 142, content system 150, and posterior data store 160 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Although not specifically shown in FIG. 1, it will be understood that portions of search system 110, algorithm selection system 132, event tracker system 140, session processor 142, content system 150, and posterior data store 160 are bidirectionally communicatively coupled for example by logical network connections as needed to perform the functionality of computing system 100. Examples of communicative coupling mechanisms include inter-process communication (IPC) interfaces and application program interfaces (APIs).

Algorithm data store 138, content system 150 and posterior data store 160 may each reside on one or more persistent and/or volatile storage devices that may reside within the same local network as one or more other components of computing system 100 and/or in a network that is remote relative to one or more other components of computing system 100. Thus, although depicted as being included in computing system 100, content system 150 and/or posterior data store 160 may be part of computing system 100 or accessed by computing system 100 over a network, such as network 120.

Logical connection as used in this disclosure may refer to a flow of digital information or data communication that is established between two devices on a network by network software communicating with, for example, the devices' operating systems either directly or by a virtual machine. Examples of protocols that may be used to establish the logical network connection include hypertext transfer protocol (HTTP) and secure sockets layer (SSL).

Algorithm Selection/Tuning

Figure 2:
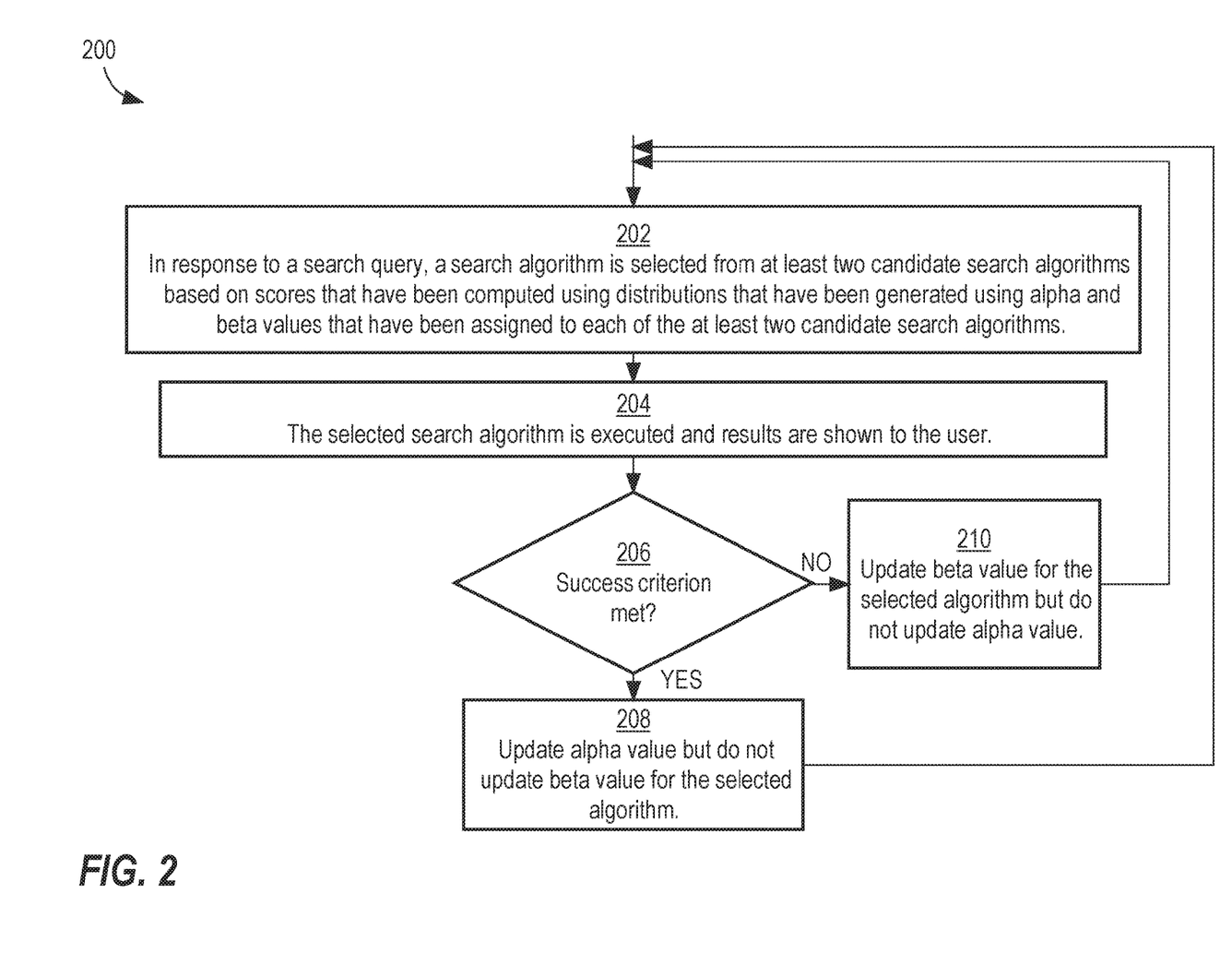
FIG. 2 is a flow diagram of a process that may be executed by one or more components of the computing system of FIG. 1.

FIG. 2 is a simplified flow diagram of an embodiment of operations that can be performed by one or more components of a computing system. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

Operation 202 is triggered by receipt of a search query, for example by search interface 112. In response to the search query, computing system 100 selects a search algorithm from a set of candidate search algorithms. To do this, computing system 100 does not select the search algorithm randomly. Instead, a search algorithm is selected based on scores that have been computed using data samples obtained from distributions that have been generated for each of the candidate search algorithms, respectively.

In an embodiment, the distributions are beta distributions having alpha values and beta values as distribution parameters. The alpha and beta values are data values that have been assigned to each of the candidate search algorithms as a result of prior executions of the algorithms. That is, each time a candidate search algorithm is executed, its alpha and beta values are calculated and stored, for example in posterior data store 160.

Each time a search query is received, the beta distributions for all of the candidate search algorithms are created at runtime using the alpha values and beta values that are stored at that time. To select an algorithm, each candidate algorithm's distribution is sampled. A score, which is indicative of the likelihood that the algorithm will be selected, is computed for that algorithm based on the values that are sampled from the distribution, and the algorithm with the highest score is chosen for execution in response to the query.

The alpha value and the beta value are indicators of a search algorithm's success in returning relevant search results in response to a query. In an embodiment, each time a search algorithm is executed, an execution count for that algorithm is incremented and stored, for example in algorithm data store 138. Additionally, each time a search algorithm is executed, its alpha and beta values are computed. The alpha value indicates the number of positive observations; that is, the count of the number of times the algorithm's execution resulted in a success as measured by the desired success metric.

The beta value indicates the number of negative observations; that is, the count of the number of times the algorithm's execution did not result in a success. To arrive at the beta value, the alpha value is subtracted from the total execution count. After the alpha and beta values are determined for an algorithm; that is, after the algorithm has been selected, executed, and had its results monitored for success or failure, the alpha and/or beta values are stored, for example in posterior data store 160. For example, the beta values can be determined by storing the total number of searches, so that the number of unsuccessful searches can be calculated by subtracting the number of successful searches from the total number of searches) or the count of unsuccessful searches may be stored directly. In an embodiment, the distribution is a continuous distribution and the alpha value and the beta value are both positive values in the range of 0 to 1, inclusive of 0 and 1.

In this way, the algorithms can be selected and tested (executed in response to a search query) concurrently in the sense that any user of search system 110 could have his or her search executed by any of the candidate algorithms at any time. However, the algorithm selected in response to any particular search query is determined based on the success scores that are computed using the distributions that are determined at runtime. As a result, the algorithm selection process of operation 202 is able to choose a search algorithm that has a high confidence of a high success rate most often but occasionally choose a new, untested search algorithm in case the new algorithm might perform better than the one with the known success rate.

If a particular algorithm performs well, its confidence value will be high, which will increase the chance that it will be selected again in response to a later received search query. If the algorithm continues to perform well, its confidence value will continue to increase the more times it is chosen and executed. Thus, the disclosed approach can quickly converge on a selection of a mathematically determined best performing algorithm while occasionally trying a different algorithm to see whether the different algorithm might perform better.

In operation 204, the search algorithm selected in operation 202 is used to execute the search query identified in operation 202. The search query is executed on a set of documents, for example documents contained in or indexed by content system 105. The execution count for the selected algorithm is incremented at this time. Results of execution of the search query using the search algorithm selected in operation 202 are shown to the user who issued the search query. Event tracking and/or session processing, such as by event tracker system 140 and/or session processor 142, described above, are initiated to monitor events and listen for significant events, in response to the system detecting input of the search query or execution of the search query.

In operation 206, computing system 100 determines whether results of execution of the search algorithm selected in operation 202 satisfy a success criterion. To do this, operation 206 queries the event data collected by, for example, event tracker system 140 and/or session processor 142, described above, to look for events in the event data that signal a successful algorithm execution or an unsuccessful algorithm execution.

In an embodiment, operation 206 computes a success score for the executed algorithm using a desired success metric and the event data that has been collected relating to the algorithm execution. The method of computing the success score and the approach for determining whether a success criterion has been met can both vary based on how success is defined and measured, and based on the types of events that are considered to be success signals. In an embodiment, the success criterion is indicated by a threshold value and operation 206 compares the computed success score to the threshold value to determine whether the success criterion has been met. If the success score exceeds the threshold value, the algorithm execution is considered successful, and if the success score does not exceed the threshold value, the algorithm execution is considered not successful.

If the success score computed by operation 206 indicates a successful algorithm execution, then in operation 208, the alpha value for that algorithm is incremented and the beta value is not updated. If the success score computed by operation 206 does not indicate a successful algorithm execution, then in operation 210 the alpha value for that algorithm is not incremented but the beta value for the algorithm is updated because the execution count for the algorithm has been updated.

After executing either operation 208 or operation 210, computing system 100 terminates process 200 or returns to operation 202 if another search query is received.

Example of Experimental Results Using Multi-Armed Bandit Testing Approach

Figure 3:
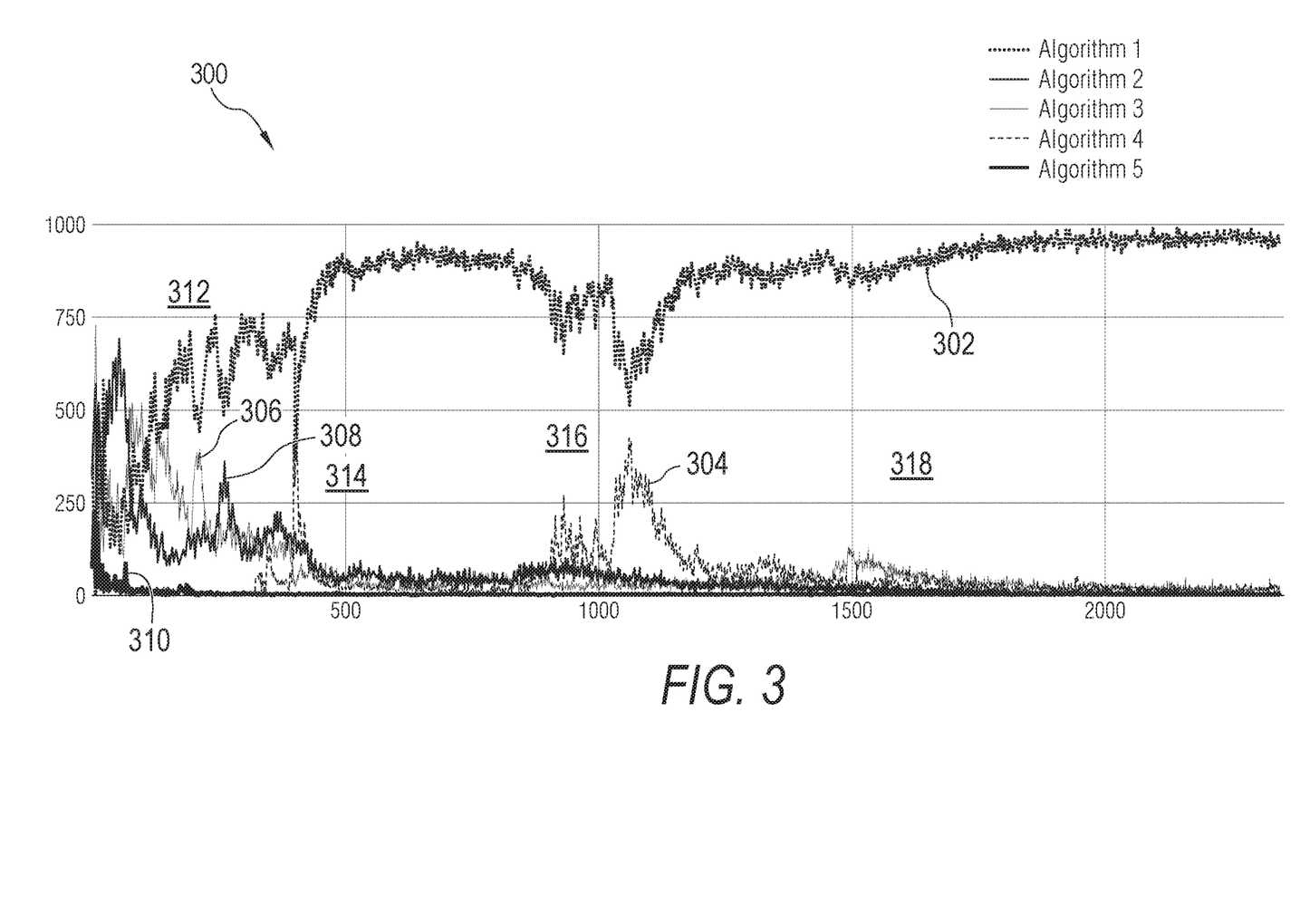
FIG. 3 is a plot showing an example of experimental results that may be produced during testing of the computing system of FIG. 1.

FIG. 3 is a plot 300 showing an example of experimental results that may be produced during testing of the computing system of FIG. 1.

In the experiment producing plot 300, there were 5 candidate search algorithms: algorithm 1 (plot 302); algorithm 2 (plot 308); algorithm 3 (plot 306); algorithm 4 (plot 304); and algorithm 5 (plot 310). In plot 300, the x axis represents the number of searches (test iterations) performed and the y axis represents the confidence scores indicating the likelihood of a search executed using a particular algorithm at a given iteration. Plot 300 shows that early in the testing, shown by area 312 (less than about 500 iterations), all of the algorithms were tested and some of the algorithms had similar likelihoods of being selected at certain iterations.

For example, at about 250 iterations, algorithms 1 and 3 had similar confidence scores on the y axis. From about 250 iterations to about 500 iterations, the testing started to converge on algorithm 1 as the algorithm with the highest confidence scores. However, at area 314 and again at area 316, algorithm 4's confidence score increased. This indicates that the algorithm selection system tried algorithm 4 occasionally to see if it produced better results than algorithm 1. However, since algorithm 4's confidence score dropped toward zero this indicates that its success rate was not comparable to that of algorithm 1.

As the number of iterations increased, the testing continued to converge on algorithm 1. Significantly, using the disclosed algorithm selection approaches, algorithm 1 was identified as the best performing algorithm within 200 iterations, or less than one hour—a much shorter time period than 7 days as had been typical for the traditional AB testing approaches. Plot 300 illustrates how the distributions adjust as more test iterations are performed. As more queries are executed, more success scores are calculated, and the success scores influence the likelihood of an algorithm being selected again. Thus, if an algorithm's success score is consistently high, it will be selected in more iterations, and its confidence score will continue to increase.

Creation and Evaluation of Task Sessions

FIG. 4 is a simplified flow diagram of an embodiment of operations that can be performed by one or more components of a computing system. The operations of a flow 400 as shown in FIG. 4 can be implemented using processor-executable instructions that are stored in computer memory. For purposes of providing a clear example, the operations of FIG. 4 are described as performed by computing system 100, but other embodiments may use other systems or implemented techniques.

Examples of metrics that can be used to measure search success include search usage (for example, percentage of user base using the search feature), click through rate (the ratio of post-search clicks to searches), and average click position (measures search result ordering by looking at how close to the top of the search result list was the document on which the user clicked). Any of these methods of computing success scores can be used in conjunction with the disclosed algorithm selection and tuning approaches.

Another method of measuring search success is shown in FIG. 4. In the approach of FIG. 4, the system measures the search success rate as the rate of searches that have a particular temporal sequence of user actions associated with them, such as view, dwell, and comment or edit actions. To do this, in an embodiment, the system creates task sessions as explained in more detail below.

In operation 402, computing system 100 assigns an identifier to a search query. In an embodiment, event data as captured by for example event tracker system 140 is queried to look for an open search event. Operation 402 assigns a task session identifier to the open search event and doing so starts a new task session. Operation 402 continues to monitor event data for significant user interface events. User interface events that are related to the search query identified in operation 402 are considered significant events for purposes of creating a task session.

In operation 404, computing system 100 detects a user interface event related to the search query identified in operation 402. Examples of user interface events related to the search query may include entering of text into a search input box, where the text may include document metadata such as author or creation date, executing the search, clicking or highlighting on a search result, loading a search result, and clicking an edit button next to a search result. Each detected significant event is assigned the same task session identifier as the open search event of operation 402.

In an embodiment, lack of engagement after a search has been opened is also tracked. Lack of engagement may be indicated by a sequence of events that includes two or more open search events in a row, without any other types of user actions in between the open search events. Another indicator of lack of engagement is an open search event but no other events found in the event data with the same task session identifier as the open search event.

In operation 408, computing system 100 iteratively examines event data in a log file or data stream, for example, and determines whether another significant user interface event has been detected that is related to the search query identified in operation 402. Computing system 100 returns to operation 406 and tags the new user interface event with the identifier assigned to the search query in operation 402.

Computing system 100 proceeds to operation 410 if another user interface event related to the search query identified in operation 402 has not been detected. In operation 410, computing system 100 determines and outputs state data for the task session. An example of state data is shown in Table 1 below.

TABLE 1

| Task Session Examples. | | |
| --- | --- | --- |
| Task Session ID | Event | Timestamp |
| 123 | Open Search, Algorithm A1 | T1 |
| | Enter Text | T2 |
| | Execute Search | T3 |
| | Edit Result Document 1 | T4 |
| | Save Document 1 | T5 |
| 456 | Open Search, Algorithm A2 | T6 |

In the example of Table 1, there are five events that make up the task session identified by Task Session ID 123 and one event that makes up the task session identified by Task Session ID 456. Using the success rate metric, the system may assign task session 123 a success score of 1, indicating a successful algorithm execution of Algorithm A1, and may assign task session 456 a success score of 0, indicating that the algorithm execution for Algorithm A2 was not successful. As indicated above, the rules or criteria used by the system to determine when a task session is considered successful are configurable based on the requirements or design of a particular implementation of the system.

When the evaluation of a task session indicates a successful algorithm execution, the alpha value for the corresponding search algorithm is updated, for example the algorithm's count of successful executions is incremented. When the evaluation of a task session indicates an unsuccessful algorithm execution, the beta value for the corresponding search algorithm is updated, for example by virtue of the algorithm's execution count being incremented without the alpha value also being incremented.

The processes of collecting event data, looking for significant events in the collected event data, grouping events into task sessions, and updating alpha values and beta values may be performed using a stream processor such as APACHE SPARK. After operation 410, computing system 100 terminates process 400 or returns to operation 402 if another search query is detected.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 5:
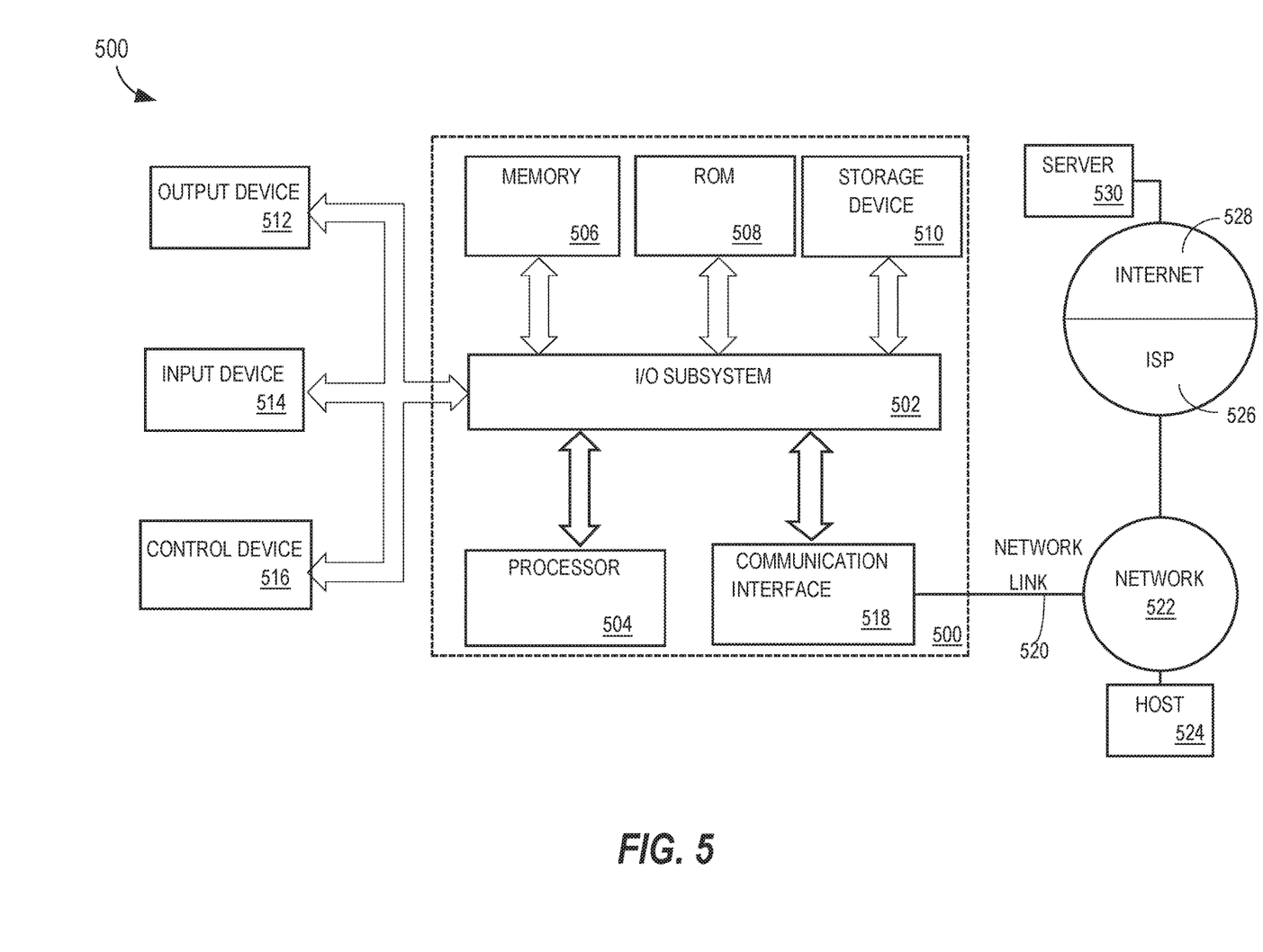
FIG. 5 is a block diagram illustrating an embodiment of a hardware system, which may be used to implement various aspects of the computing system of FIG. 1.

For example, FIG. 5 is a block diagram that illustrates a computer system 500 upon which an embodiment of the present invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a computer system includes at least one processor; at least one non-transitory digital data storage medium storing sequences of executable program instructions which when executed by the at least one processor cause performing: creating and storing a digital repository capable of storing digital work items; receiving a query; determining historical alpha values and historical beta values for each of at least two candidate search algorithms; for each of the at least two candidate search algorithms, generating a beta distribution using the historical alpha values and the historical beta values as parameters; for each of the at least two candidate search algorithms, computing, using values sampled from the beta distribution, a score that indicates a likelihood of the candidate search algorithm producing a search result that satisfies a relevance criterion; selecting, from the at least two candidate search algorithms, an algorithm that has a score that satisfies a selection criterion; executing the query using the selected algorithm. An example 2 includes the subject matter of example 1, where a search algorithm includes a set of relevance factor-weight value pairs, and each of the at least two candidate search algorithms includes at least one different relevance factor-weight value pair. An example 3 includes the subject matter of example 1 or example 2, where an alpha value of the historical alpha values corresponds to a count of successful prior executions of a particular candidate search algorithm. An example 4 includes the subject matter of any of examples 1-3, where a beta value of the historical beta values corresponds to a count of unsuccessful prior executions of a particular candidate search algorithm. An example 5 includes the subject matter of any of examples 1-4, further including sequences of instructions which when executed cause determining that a prior execution of the particular candidate search algorithm is successful based on an evaluation of a temporal sequence of user interface events occurring after the query is received. An example 6 includes the subject matter of any of examples 1-5, further including sequences of instructions which when executed cause identifying a significant event in the temporal sequence of user interface events and creating an alpha value in response to the significant event, the alpha value for use in generating the beta distribution.

In an example 7, at least one non-transitory digital data storage medium storing sequences of executable program instructions which when executed by at least one processor cause the at least one processor to: in response to a query received by a search system, determine historical alpha values and historical beta values for each of at least two candidate search algorithms; for each of the at least two candidate search algorithms, generate a distribution using the historical alpha values and the historical beta values as parameters; for each of the at least two candidate search algorithms, compute, using values sampled from the distribution, a score that indicates a likelihood of the candidate search algorithm producing a search result that satisfies a relevance criterion; select, from the at least two candidate search algorithms, an algorithm that has a score that satisfies a selection criterion; and cause the search system to execute the query on a repository of digital work items using the selected algorithm.

An example 8 includes the subject matter of example 7, further including sequences of instructions which when executed cause the at least one processor to obtain the historical alpha values and the historical beta values from a data store that is co-located with the sequences of executable program instructions. An example 9 includes the subject matter of example 7 or example 8, where the sequences of executable program instructions are contained in an enterprise work management system that is instrumented to link at least one user interface event to a related query. An example 10 includes the subject matter of any of examples 7-9, where a search algorithm includes a set of relevance factor-weight value pairs, and each of the at least two candidate search algorithms includes at least one different relevance factor-weight value pair. An example 11 includes the subject matter of any of examples 7-10, where an alpha value of the historical alpha values corresponds to a count of successful prior executions of a particular candidate search algorithm. An example 12 includes the subject matter of any of examples 7-11, further including sequences of instructions which when executed cause the at least one processor to determine that a prior execution of the particular candidate search algorithm is successful based on an evaluation of a temporal sequence of user interface events occurring after the query is received. An example 13 includes the subject matter of any of examples 7-12, further including sequences of instructions which when executed cause the at least one processor to identify a significant event in the temporal sequence of user interface events and determine an alpha value based on the significant event. An example 14 includes the subject matter of any of examples 7-12, where a beta value of the historical beta values corresponds to a count of unsuccessful prior executions of a particular candidate search algorithm.

In an example 15, a method for an automated agent to select a search algorithm to be executed on a set of digital items in response to a query, the method including: determining historical alpha values and historical beta values for each of at least two candidate search algorithms; for each of the at least two candidate search algorithms, generating a distribution using the historical alpha values and the historical beta values as parameters; for each of the at least two candidate search algorithms, computing, using values sampled from the distribution, a score that indicates a likelihood of the candidate search algorithm producing a search result that satisfies a relevance criterion; selecting, from the at least two candidate search algorithms, an algorithm that has a score that satisfies a selection criterion; and causing the query to be executed on the set of digital items using the selected algorithm.

An example 16 includes the subject matter of example 15, further including determining an alpha value of the historical alpha values by counting successful prior executions of a particular candidate search algorithm. An example 17 includes the subject matter of example 15 or example 16, further including determining that a prior execution of the particular candidate search algorithm is successful based on an evaluation of a temporal sequence of user interface events occurring after the query is received. An example 18 includes the subject matter of example 17, further including identifying a significant event in the temporal sequence of user interface events and determining the alpha value based on the significant event. An example 19 includes the subject matter of any of examples 15-18, further including determining a beta value of the historical beta values by counting unsuccessful prior executions of a particular candidate search algorithm. An example 20 includes the subject matter of any of examples 15-18, further including obtaining the historical alpha values and the historical beta values from a data store that is co-located with the automated agent, the automated agent contained in an enterprise work management system.

In an example 21, a computer-implemented method providing an improvement in digital electronic search query systems that operate to search a content system having electronic documents in which, for each particular document, some or all of the contents of the particular document are private, inaccessible or not subject to automated syntactic or semantic analysis, includes: receiving a search query from a user account; determining historical alpha values and historical beta values for each of at least two candidate search algorithms, each of the alpha values being computed by counting successful prior executions of a particular candidate search algorithm, a prior execution of the particular candidate search algorithm being successful based on an evaluation of a temporal sequence of user interface events occurring after the query is received, and including identifying a significant event in the temporal sequence of user interface events and determining the alpha value based on the significant event, each beta value of the historical beta values being determined by counting unsuccessful prior executions of a particular candidate search algorithm; for each of the at least two candidate search algorithms, creating and storing in computer memory a distribution of digital values using the historical alpha values and the historical beta values as parameters; for each of the at least two candidate search algorithms, computing, using values sampled from the distribution, a score of a likelihood that the candidate search algorithm will produce a search result that satisfies a relevance criterion; selecting, from the at least two candidate search algorithms, an algorithm that has a score that satisfies a selection criterion; executing the query on the set of digital items using the selected algorithm to produce a result set; transmitting the result set to the user account.

An example 22 includes the subject matter of example 21, and further includes any of the subject matter of any of examples 1-20. In other examples, any of examples 1-20 further include one or more features of example 22.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer system comprising:
   at least one processor; and
   at least one non-transitory digital data storage medium storing sequences of executable program instructions which, when executed by the at least one processor, cause performance of:
   creating a digital repository of storing a plurality of digital work items; receiving a search query as a user input;
   selecting a search algorithm to service the search query from a plurality of candidate search algorithms by:
   determining, for a first candidate search algorithm:
      a first alpha value representing a historical number of successful searches performed by the first candidate search algorithm;
      a first beta value representing a historical number of unsuccessful searches performed by the first candidate search algorithm; and
      generating a first beta distribution with the first alpha value and the first beta value as parameters;
   determining, for a second candidate search algorithm:
      a second alpha value representing a historical number of successful searches performed by the second candidate search algorithm;
      a second beta value representing a historical number of unsuccessful searches performed by the second candidate search algorithm; and
      generating a second beta distribution with the second alpha value and the second beta value as parameters;
   for the first candidate search algorithm, computing, using sample values from the first beta distribution, a first probability distribution corresponding to a first likelihood of the first candidate search algorithm producing a first search result that satisfies a relevance criterion;
   for the second candidate search algorithm, computing, using sample values from the second beta distribution, a second probability distribution corresponding to a second likelihood of the second search candidate search algorithm producing a second search result that satisfies the relevance criterion; and
   selecting one of the first candidate search algorithm or the second candidate search algorithm by determining which of the first probability distribution or the second probability distribution is greater; and
   executing the search query against the digital repository using the selected one of the first candidate search algorithm or the second candidate search algorithm and returning at least one digital work item of the plurality of digital work items.

2. The computer system of claim 1, wherein:
   the first candidate search algorithm comprises a first set of relevance factor-weight value pairs; and
   the second candidate search algorithm comprises a second set of relevance factor-weight value pairs, the second set of relevance factor-weight value pairs different tom the first set of relevance factor-weight value pairs.

3. The computer system of claim 1, wherein the sequences of executable program instructions, when executed by the at least one processor, further cause performance of determining that a prior execution of a particular candidate search algorithm is successful based on an evaluation of a temporal sequence of user interface events occurring after the search query is received.

4. The computer system of claim 3, wherein the sequences of executable program instructions, when executed by the at least one processor, further cause performance of:
   identifying a significant event in the temporal sequence of the user interface events; and
   creating an alpha value in response to the significant event, the alpha value usable to generate a beta distribution.

5. At least one non-transitory digital data storage medium storing sequences of executable program instructions which, when executed by at least one processor, cause the at least one processor to perform:
   creating a digital repository storing a plurality of digital work items;
   receiving a search query as a user input;
   selecting a search algorithm to service the search query from a plurality of candidate search algorithms by:
   determining, for a first candidate search algorithm:
      a first alpha value representing a historical number of successful searches performed by the first candidate search algorithm;
      a first beta value representing a historical number of unsuccessful searches performed by the first candidate search algorithm; and
      generating a first beta distribution with the first alpha value and the first beta value as parameters;
   determining, for a second candidate search algorithm:
      a second alpha value representing a historical number of successful searches performed by the second candidate search algorithm;
      a second beta value representing a historical number of unsuccessful searches performed by the second candidate search algorithm;
      generating a second beta distribution with the second alpha value and the second beta value as parameters;
   for the first candidate search algorithm, computing, using sample values from the first beta distribution, a first probability distribution corresponding to a first likelihood of the first candidate search algorithm producing a first search result that satisfies a relevance criterion;
   for the second candidate search algorithm, computing, using sample values from the second beta distribution, a second probability distribution corresponding to a second likelihood of the second search candidate search algorithm producing a second search result that satisfies the relevance criterion; and
   selecting one of the first candidate search algorithm or the second candidate search algorithm by determining which of the first probability distribution or the second probability distribution is greater; and
   executing the search query against the digital repository using the selected one of the first candidate search algorithm or the second candidate search algorithm and returning at least one digital work item of the plurality of digital work items.

6. The at least one non-transitory digital data storage medium of claim 5, wherein the sequences of executable program instructions, when executed by the at least one processor, further cause the at least one processor b obtain at least one parameter of the first, second, third, or fourth parameters from a data store that is co-located with the sequences of executable program instructions.

7. The at least one non-transitory digital data storage medium of claim 5, wherein the sequences of executable program instructions are contained in an enterprise work management system that is instrumented to link at least one user interface event to a related query.

8. The at least one non-transitory digital data storage medium of claim 5, wherein:
   the first candidate search algorithm comprises a first set of relevance factor-weight value pairs; and
   the second candidate search algorithm comprises a second set of relevance factor-weight value pairs, the second set of relevance factor-weight value pairs different from the first set of relevance factor-weight value pairs.

9. The at least one non-transitory digital data storage medium of claim 5, wherein the sequences of executable program instructions, when executed by the at least one processor, further cause the at least one processor to determine that a prior execution of the first candidate search algorithm is successful based on an evaluation of a temporal sequence of user interface events occurring alter the query is received.

10. The at least one non-transitory digital data storage medium of claim 9, wherein the sequences of executable program instructions, when executed by the at least one processor, further cause the at least one processor to:
   identify a significant event in the temporal sequence of the user interface events; and
   determine the first shape parameter based at least in part on he significant event.

11. A method br selecting a search algorithm b be executed in response to a query, the method comprising:
   creating, by a processor, a digital repository storing a plurality of digital work items;
   receiving, by the processor, a search query as a user input;
   selecting, by the processor, a search algorithm to service the search query from a plurality of candidate search algorithms by:
   determining, by the processor, for a first candidate search algorithm:
      a first alpha value representing a historical number of successful searches performed by the first candidate search algorithm;
      a first beta value representing a historical number of unsuccessful searches performed by the first candidate search algorithm; and
      generating, by the processor, a first beta distribution with the first alpha value and the first beta value as parameters;
   determining, by the processor, for a second candidate search algorithm:
      a second alpha value representing a historical number of successful searches performed by the second candidate search algorithm;
      a second beta value representing a historical number of unsuccessful searches performed by the second candidate search algorithm;
      generating, by the processor, a second beta distribution with the second alpha value and the second beta value as parameters;
   for the first candidate search algorithm, computing, by the processor, using sample values from the first beta distribution, a first probability distribution corresponding to a first likelihood of the first candidate search algorithm producing a first search result that satisfies a relevance criterion;

for the second candidate search algorithm, computing, by he processor, using sample values from the second beta distribution, a second probability distribution corresponding to a second likelihood of the second search candidate search algorithm producing a second search result that satisfies the relevance criterion; and selecting, by the processor, one of the first candidate search algorithm or the second candidate search algorithm by determining which of the first probability distribution or the second probability distribution is greater; and executing, by the processor, the search query against the digital repository using the selected one of the first candidate search algorithm or the second candidate search algorithm and returning at least one digital work item of the plurality of digital work items.

12. The method of claim 11, further comprising:

identifying a significant event in the temporal sequence of the user interface events; and determining at least one shape parameter based on he significant event.

13. A computer-implemenbd method providing an improvement in digital electronic search query systems that operate to search a content system having electronic documents, the computer-implemented method comprising:

receiving, by a processor, a search query from a user account;

generating, by the processor, a first beta distribution for a first candidate search algorithm, the first beta distribution having an alpha parameter based on a count of successful searches performed by the first candidate search algorithm and a beta parameter based on a count of unsuccessful searches performed by the first candidate search algorithm;

generating, by the processor, a second beta distribution for a second candidate search algorithm, the second beta distribution having an alpha parameter based on a count of successful searches performed by the second candidate search algorithm and a beta parameter based on a count of unsuccessful searches performed by the second candidate search algorithm;

for the first candidate search algorithm, computing, by the processor, using sample values from the first beta distribution of digital values, a first probability distribution corresponding to a first likelihood of the first candidate search algorithm producing a first search result that satisfies a relevance criterion;

for the second candidate search algorithm, computing, by the processor, using sample values from the second beta distribution of digital values, a second probability distribution corresponding to a second likelihood of the second search candidate search algorithm producing a second search result that satisfies the relevance criterion;

selecting, by the processor, one of the first candidate search algorithm or the second candidate search algorithm based on determining which of the first probability distribution or the second probability distribution is greater;

executing, by the processor, the search query on the content system using the selected one of the first candidate search algorithm or the second candidate search algorithm to produce a result set; and transmitting, by the processor, the result set to the user account.

* * * * *